July 24, 1934.  F. H. LAMOREAUX  1,967,891

AGITATOR DRIVE

Filed May 18, 1933 2 Sheets-Sheet 1

INVENTOR
Frank H. Lamoreaux
BY
Munn, Anderson, Stanley, Foster & Widdy.
ATTORNEYS

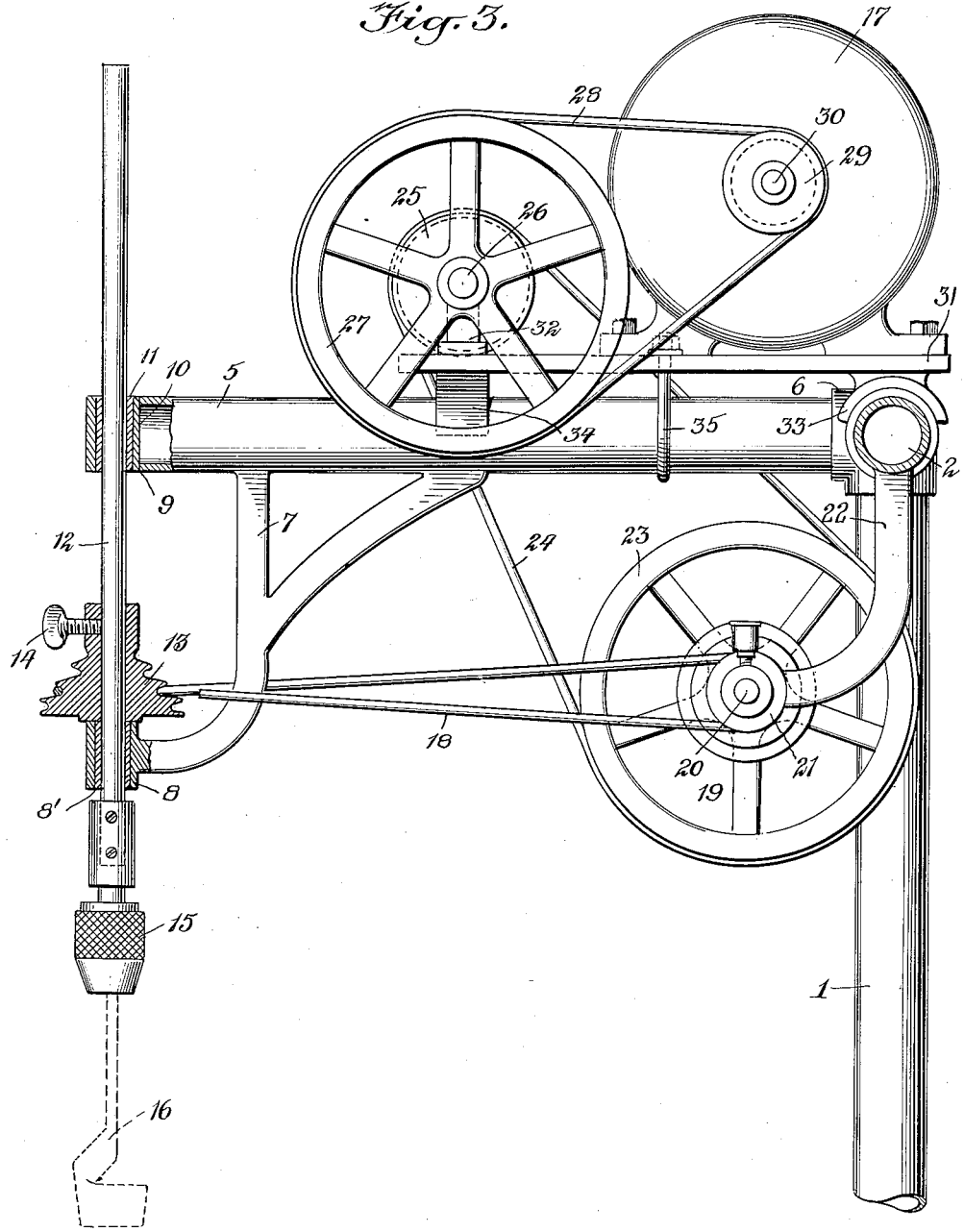

Patented July 24, 1934

1,967,891

UNITED STATES PATENT OFFICE 1,967,891

AGITATOR DRIVE

Frank H. Lamoreaux, Bayonne, N. J.

Application May 18, 1933, Serial No. 671,775

3 Claims. (Cl. 259—131)

This invention relates to driving mechanisms and particularly to an improved agitator drive used in chemical laboratories or elsewhere, the object being to provide a construction which is simple and yet strong and efficient with the parts so formed that a single agitator may be driven or a plurality of agitators may be driven.

A further object of the invention is to provide an improved construction of drives for driving agitating devices wherein a single power element may be so mounted as to be readily connected with a number of agitator receiving chucks, with the parts so arranged that the chucks may be driven at the same speed or at different speeds, while the power member is operating at a continuous speed.

A still further object, more specifically, is the provision of the construction for supporting and driving agitators in chemical laboratories or elsewhere wherein a framework is provided having one or more arms with the power element supported by the frame and one of the arms, and with connections in the power element to the various arms for driving agitator receiving members carried thereby.

In the accompanying drawings—

Figure 3 is an enlarged sectional view through Figure 2, approximately on the line 3—3.

In many places where the mixing or agitating of ingredients is necessary, various forms of power driven devices are used to rotate the mixers or agitating beating elements while in contact with the matter to be mixed. In laboratories it is quite customary to have numerous batches of liquids or semi-liquids which must be mixed before being utilized. In the present invention an improved structure is provided whereby containers having one or more mixtures may be used with an independent agitator or stirring device operated in each container. The structure is such that these stirring devices may be operated at the same speed or at different speeds according to the desire of the operator.

Figure 1:
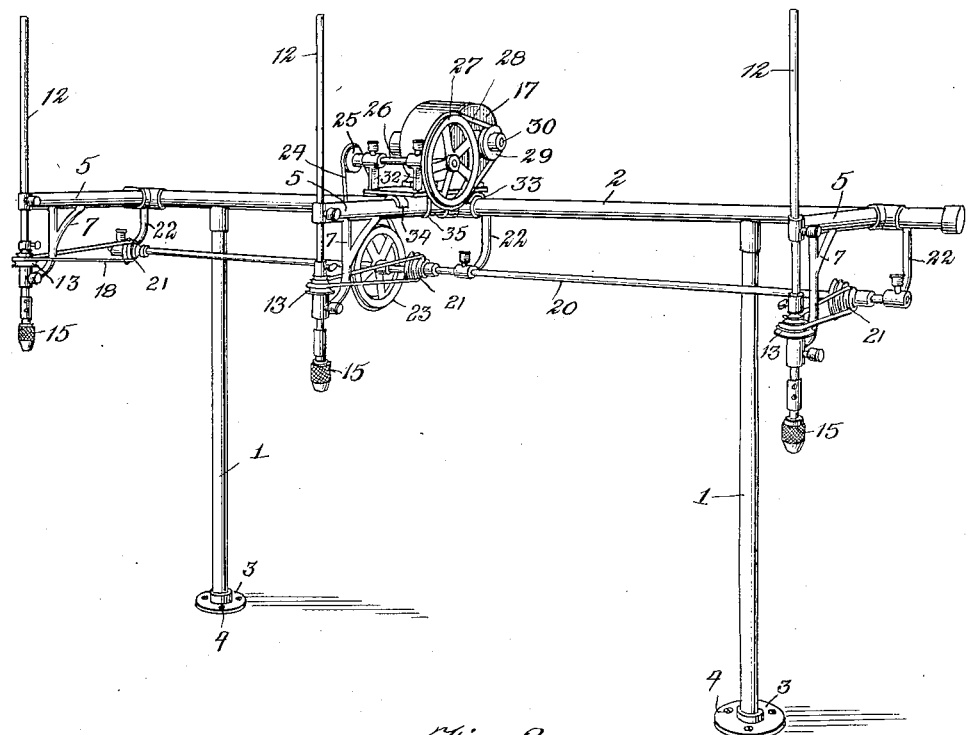
Figure 1 is a perspective view showing an agitator drive disclosing an embodiment of the invention.
Figure 2:
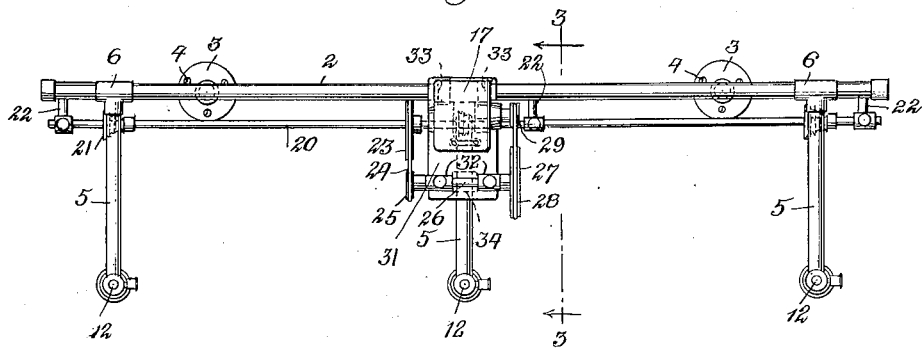
Figure 2 is a top plan view of the structure shown in Figure 1, the same being on a slightly reduced scale.

As illustrated in Figure 1, there is provided supporting posts 1 which support a longitudinal tube 2 which, if desired, may be a solid bar, but is preferably a tube and welded or otherwise rigidly secured to the supporting posts 1. Posts 1 are preferably secured to the floor through the members 3, which members are rigidly secured to the posts 1 by welding, threads or otherwise, and are connected to the floor by suitable screws 4. In this way the supporting bar 2 is held rigidly in place and acts to support the remaining parts of the device. As shown in the drawings, there are three arms 5 secured to the bar 2 by welding or other desired means. As all of these arms are identical a description of one will apply to all.

As illustrated in Figure 3 the arm 5 is in the form of a tube and, if desired, may be screwed into the fitting 6 but is preferably welded thereto so that the parts will be absolutely rigid. A bracket 7 is welded or otherwise rigidly secured to arm 5 and is formed at the lower end with a vertically disposed tubular sleeve 8, while the arm 5 is provided with a notch 9 having a sleeve 10 secured thereto by welding or in any other desired manner. A bearing sleeve 11 is mounted in the sleeve 10 and through this bearing sleeve a rod 12 extends, said rod being slidably and rotatably mounted in sleeve 11 as well as in bearing sleeve 8'. A cone pulley 13 is rigidly secured to the rod 12 by a set screw 14 and rests on the top of the tubular member 8. A chuck 15 of any desired kind is secured by screws or otherwise to the shaft 2 and is adapted to disengageably receive an agitator or mixing member 16.

When in use the mixing member or agitator 16 extends into the container in which the mixtures are placed, so that when the agitator 16 is rotated it will produce the desired mixing or agitating action. By reason of the way the agitator 16 is connected to the rod 12 it will be seen that rod 12 may be raised or lowered according to the circumstances so as to accommodate different sized containers or to position the agitator in different relative places with respect to the container. It will, of course, be understood that the chuck 15 of the various arms 5 may be independently raised or lowered as desired, and by reason of the stepped or cone pulleys 13 the various chucks may be rotated at the same speed or at different speeds according to the wish of the individual operator, while the motor 17 is functioning at the same speed. The belt 18 is fitted over the pulley 13 and preferably over a comparatively small pulley 19 which is rigidly secured to the shaft 20, said shaft being rotatably supported in the bearing 21 carried by the respective brackets 22. It will be understood that the bracket 22 is arranged adjacent each of the arms 5 as shown in Figure 1, so that the shaft 20 is properly supported at desired points.

By shifting the belts on the respective pulleys 13 the respective chucks 15 may be operated at different speeds, while shaft 20 is operating at the same speed. It is, of course, understood that the various pulleys 19 are rigidly secured to shaft 20 and in addition that the pulley or grooved wheel 23 is also secured to shaft 20.

A belt 24 is fitted on to the pulley 23 and fits also over the small pulley 25 which is rigidly secured to the short shaft 26. Rigidly secured to shaft 26 is a comparatively large pulley 27 accommodating a belt 28. Belt 28 is fitted over a comparatively short belt 29 rigidly secured to the rotating shaft 30 which is secured to the rotating part of motor 17. Motor 17 is bolted or otherwise rigidly secured to the platform 31 and on this platform suitable brackets 32 are mounted for supporting shaft 26. Saddles 33 and 34 are provided for partly straddling the bar 2 of the supporting frame and one of the brackets 5. A U-shaped bolt 35, as shown in Figure 3, firmly clamps the platform 31 in place so that as motor 17, which is preferably an electric motor, functions power will be transmitted therefrom through belt 28 to pulley 27, shaft 26, pulley 25, belt 24 and pulley 23 to shaft 20. This arrangement provides means for driving shaft 20 at a constant speed and power is adapted to be taken from this shaft by the respective pulleys 21. If desired, one or more belts 18 could be lifted completely off their pulleys so that their respective chucks 15 would not function. In this way one or more chucks would be caused to function, though ordinarily all the chucks are operating whether being used or not, as the power necessary to rotate the chucks is very small unless the agitator or stirring member 16 is being used. By having all of the chucks rotating continually an operator may place a container beneath any of the chucks carrying an agitator to cause the agitator to function a short time or a long time as preferred.

I claim:

1. A device of the character described comprising a frame formed with a plurality of supporting uprights and a bar connecting said uprights, a plurality of brackets rigidly secured to said bar, means at one end of each of said brackets for supporting a rotating chuck carrying shaft, means for supporting a motor on one of said brackets and on said bar, a plurality of auxiliary brackets carried by said bar, a power shaft carried by said auxiliary brackets and positioned parallel to said bar, means for transmitting power from said motor to said power shaft, and means for transmitting power from said power shaft individually to the chuck carrying shafts carried by said brackets.

2. In a device of the character described, a framework including a pair of supporting standards, a bar rigidly secured to said supporting standards, a plurality of primary brackets rigidly secured to said bar at spaced points, a plurality of auxiliary brackets secured to said bar at spaced points, a power shaft rotatably mounted on said auxiliary brackets, an agitator carrying shaft rotatably mounted on each of the first mentioned brackets, means including a belt for each of said agitator carrying shafts for transmitting power from the power shaft to the agitator carrying shafts, and means carried by one of said first mentioned brackets for transmitting power to said power shaft.

3. A device of the character described comprising a frame having an arm, a vertically disposed rotatable shaft carried by said arm, a platform arranged above said arm, a plurality of saddles carried by said platform, one of said saddles straddling and resting on said arm, and the remaining saddles resting on said frame, a clamping member for clamping said platform and saddles to the frame and arm respectively, a motor carried by said platform, and means for transmitting power from said motor to the vertically disposed rotatable shaft carried by said arm whereby said shaft is adapted to be rotated.

FRANK H. LAMOREAUX.